United States Patent [19]
Kaneda et al.

[11] Patent Number: 5,313,449
[45] Date of Patent: May 17, 1994

[54] OPTICAL RECORDING MEDIUM AND METHOD OF OPTICALLY PLAYING BACK SAME INCLUDING RECORDING MEDIUM STRUCTURE OPERATING AS OPTICAL RESONATORS EMITTING APPLIED PUMPING LIGHT AT A VARIABLE FREQUENCY

[75] Inventors: Yushi Kaneda; Shigeo Kubota, both of Kanagawa; Hisashi Masuda, Tokyo, all of Japan

[73] Assignee: Sony Corporation, Tokyo, Japan

[21] Appl. No.: 946,611

[22] Filed: Sep. 18, 1992

[30] Foreign Application Priority Data

Sep. 19, 1991 [JP] Japan .................................. 3-239753

[51] Int. Cl.$^5$ .............................................. G11B 7/00
[52] U.S. Cl. .................................. 369/121; 369/100; 369/111; 369/275.4
[58] Field of Search ......................... 369/275.3–275.4, 369/280, 283, 286, 288, 54, 100, 111, 121, 122, 124, 106

[56] References Cited

U.S. PATENT DOCUMENTS

| | | | |
|---|---|---|---|
| 4,041,530 | 8/1977 | Kramer et al. | 369/275.4 X |
| 4,481,620 | 11/1984 | Murakami | 369/275.4 |
| 4,855,992 | 8/1989 | Ikegawa et al. | 369/275.4 X |
| 4,891,800 | 1/1990 | Sugaya | 369/275.4 |
| 5,182,743 | 1/1993 | Tinet | 369/275.4 |

Primary Examiner—W. R. Young
Attorney, Agent, or Firm—Hill, Steadman & Simpson

[57] ABSTRACT

An optical recording medium, typically an optical disc, has a recording region of a laser medium extending thicknesswise thereof, and a reference region positioned radially inwardly of the recording region for emitting reference light. The recording region has pits and lands formed on a surface thereof as representing recorded information. The pits and lands having respective first surfaces parallel to corresponding second surfaces on an opposite surface of the recording region. The first and second surfaces provide different thicknesses of the recording region. When pumping light emitted from a semiconductor laser, for example, is applied to the recording region, the recording region operates as optical resonators between the first and second surfaces for emitting laser signal light of a variable frequency depending on the recorded information. The optical resonators have respective optical axes extending thicknesswise of the recording region.

8 Claims, 3 Drawing Sheets

OPTICAL RECORDING MEDIUM AND METHOD OF OPTICALLY PLAYING BACK SAME INCLUDING RECORDING MEDIUM STRUCTURE OPERATING AS OPTICAL RESONATORS EMITTING APPLIED PUMPING LIGHT AT A VARIABLE FREQUENCY

BACKGROUND OF THE INVENTION

1. Field of the Invention

The present invention relates to an optical recording medium which can be played back by a light beam that is applied thereto to read the information recorded as bits on the surface of the optical recording medium, and a method of playing back such an optical recording medium.

2. Description of the Prior Art

Presently available optical recording mediums, i.e., optical discs, store information in the form of pits, for example, burned in their surfaces. To read the recorded information from an optical disc, a light beam is applied to the information recording surface of the optical disc, and a beam of light reflected by the surface or transmitted through the optical disc is detected.

Recently, efforts have been made to achieve higher recording density in such optical information recording technology. One attempt is to record multivalued information in the form of pits having different stepwise depths for higher information packing density. However, manufacturing limitations and detecting accuracy problems have imposed difficulties on the recording of multivalued information on optical discs.

According to another proposal, a reading light beam of shorter wavelength is used to read information recorded as binary signals on optical discs. Because of the limited sensitivity of light detectors used to detect such a reading light beam, however, information can be recorded on optical discs in a packing density only up to three times the present level. In addition, since the recorded information on optical discs is read using the interference of light, the level of a reproduced output signal indicative of the recorded information is relatively low, and hence the signal-to-noise (S/N) and carrier-to-noise (C/N) ratios thereof are also relatively low.

OBJECTS AND SUMMARY OF THE INVENTION

It is an object of the present invention to provide an optical recording medium which can be played back in a novel fashion for higher reproduced output level and increased S/N and C/N ratios, and which can record multi-valued information for higher recording density.

Another object of the present invention is to provide a method of optically playing back an optical recording medium.

According to the present invention, there is provided an optical recording medium comprising a recording region at least partly composed of a laser medium extending thicknesswise thereof, the recording region having pits and lands formed on a principal surface thereof as representing recorded information, the pits and lands having respective first surfaces parallel to corresponding second surfaces on an opposite reverse surface of the recording region, the first and second surfaces providing different thicknesses of the recording region, whereby the recording region can operate as optical resonators between the first and second surfaces for emitting laser signal light of a variable frequency depending on the recorded information in response to pumping light applied to the recording region, the optical resonators having respective optical axes extending thicknesswise of the recording region.

The recording region has a thickness d selected in the range of:

$$(C/2nB) \leq d \leq (c/nmB)$$

where n is the refractive index of the laser medium, B is the gain bandwidth of the laser medium, and c is the speed of light.

The optical recording medium further includes a reference region for emitting reference light having a constant frequency to detect a change in the frequency of the signal light emitted from the recording region based on the difference between the frequencies of the signal light and the reference light. In the case where the optical recording medium comprises an optical disc, the reference region is positioned radially inwardly of the recording region.

According to the present invention, there is also provided a method of optically playing back an optical recording medium having a recording region at least partly composed of a laser medium extending thicknesswise thereof, the recording region having pits and lands formed on a surface thereof as representing recorded information, the pits and lands having respective first surfaces parallel to corresponding second surfaces on an opposite surface of the recording region, the first and second surfaces providing different thicknesses of the recording region, whereby the recording region can operate as optical resonators between the first and second surfaces for emitting laser signal light of a variable frequency depending on the recorded information in response to pumping light applied to the recording region, the optical resonators having respective optical axes extending thicknesswise of the recording region, the method comprising the steps of applying pumping light to the recording region to cause the recording region to operate as optical resonators between the first and second surfaces for emitting laser signal light of a variable frequency depending on the recorded information, and detecting a change in the frequency of the signal light to reproduce the recorded information.

The above and other objects, features, and advantages of the present invention will become apparent from the following description of illustrative embodiments thereof to be read in conjunction with the accompanying drawings, in which like reference numerals represent the same or similar objects.

DESCRIPTION OF THE PREFERRED EMBODIMENTS

Figure 1:
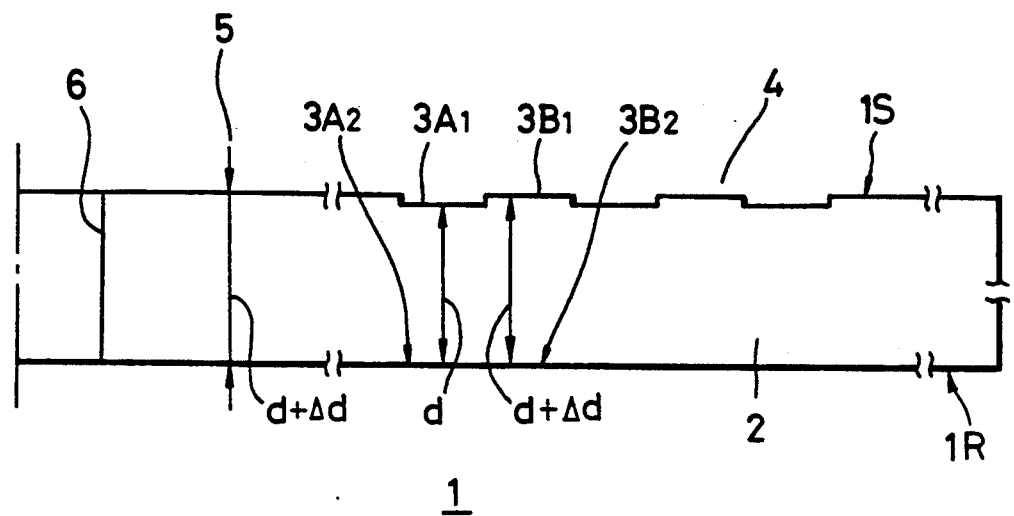
FIG. 1 is an enlarged fragmentary cross-sectional view of an optical recording medium according to the present invention.

Like or corresponding reference characters denote like or corresponding parts throughout views.

Figure 4:
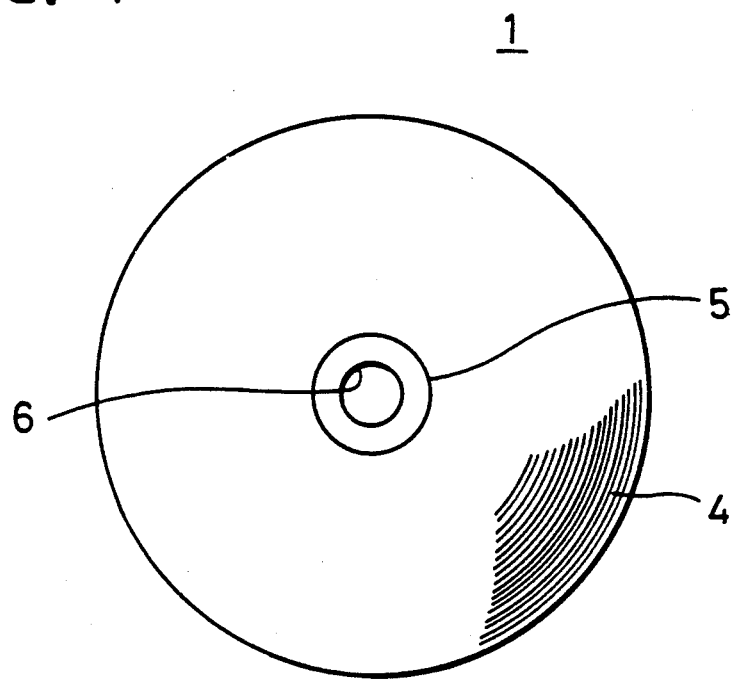
FIG. 4 is a plan view of the optical recording medium.

FIG. 1 schematically shows, in cross section, an optical recording medium, generally designated by the reference numeral 1, according to the present invention. As shown in FIG. 1, the optical recording medium 1, which is illustrated in the form of an optical disc, is made in its entirety of a laser medium 2 such as of Nd:YAG or the like. The optical recording medium 1 includes a recording region 4, which is made of the laser medium 2 entirely thickness wise, and a reference region 5 extending radially inwardly of the recording region 4, as shown in FIG. 4. The optical recording medium 1 also has a central hole 6 for the insertion of a spindle which serves to fix and rotate the optical recording medium 1.

As shown in FIG. 1, the recording region 4 has a principal surface 1S with pits and lands formed thereon by photolithography, for example, as representing recorded information. The pits and lands have respective bottom and top surfaces lying parallel to a reverse surface 1R of the optical recording medium 1. Specifically, each of the pits has a bottom surface $3A_1$, and the reverse surface 1R has a corresponding surface $3A_2$ parallel thereto. The surfaces $3A_1$, $3A_2$ are spaced from each other by a distance d, or recording region 4 has a thickness d between the surfaces $3A_1$, $3A_2$. Each of the lands has a top surface $3B_1$, and the reverse surface 1R has a Corresponding surface $3B_2$ parallel thereto. The surfaces $3B_1$, $3B_2$ are spaced from each other by a distance $d+\Delta d$, or the recording region 4 has a thickness $d+\Delta d$ between the surfaces $3B_1$, $3B_2$. The information recorded in the recorded region 4 is stored as binary information that is represented by two states which correspond respectively to different distances or thicknesses d, $d+\Delta d$ between the surfaces $3A_1$, $3A_2$ and $3B_1$, $3B_2$. When pumping light is applied transversely to the recording region 4, the recording region 4 operates as optical resonators whose optical axes extend thickness-wise of the optical recording medium 1. Since the recording region 4 has different distances or thicknesses d, $d+\Delta d$ between the surfaces $3A_1$, $3A_2$ and $3B_1$, $3B_2$, the length of the optical resonators varies depending on the position on the recording region 4.

The reference region 5 has a Constant thickness which is equal, for example, to the distance $d+\Delta d$ that represents one of the two states indicative of the recorded information.

Figure 2:
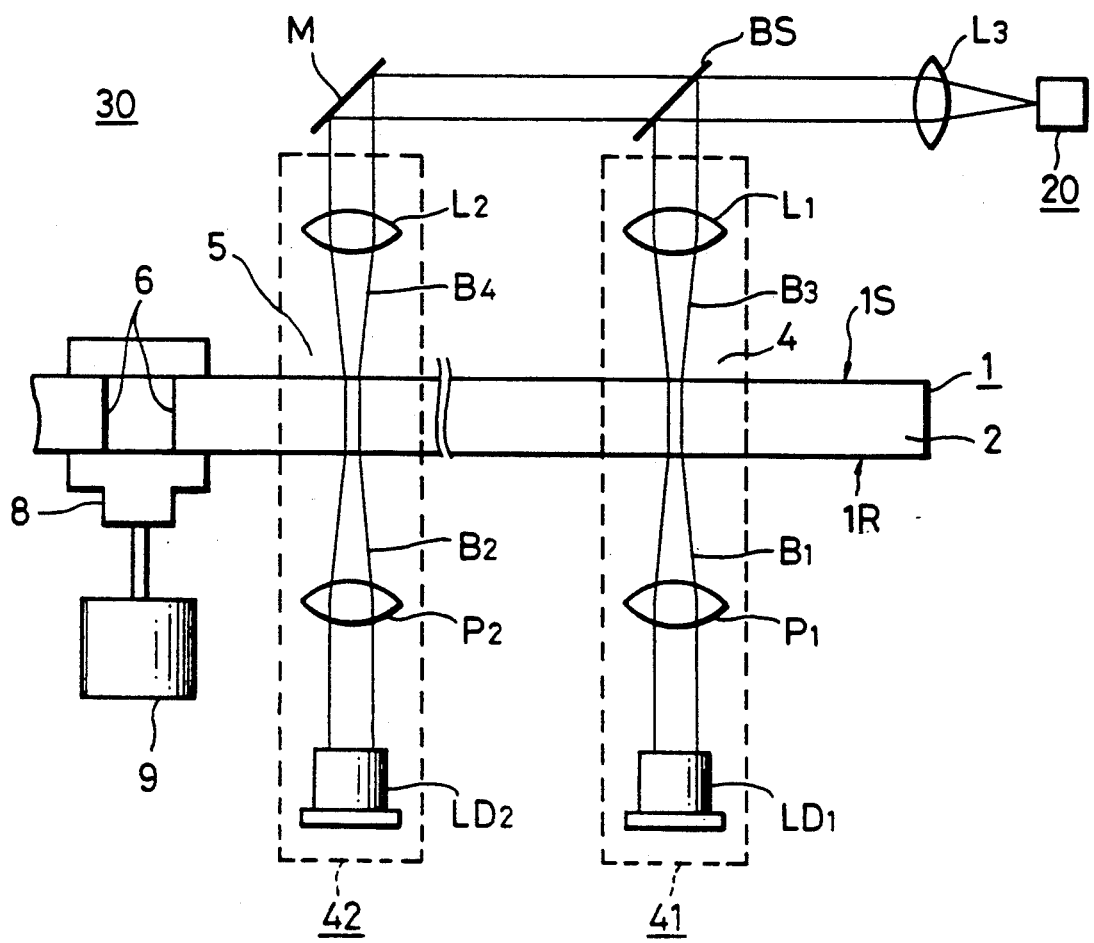
FIG. 2 is a schematic cross-sectional view of a playback system for optically playing back the optical recording medium.

FIG. 2 schematically shows a playback system for optically playing back the optical recording medium 1. As shown in FIG. 2, the playback system includes a signal light optical system 41 positioned across the recording region 4 for producing signal light and a reference light optical system 42 positioned across the reference region 5 for producing reference light. The signal and reference light optical systems 41, 42 have respective pump sources $LD_1$, $LD_2$ comprising semiconductor lasers such as laser diodes or the like disposed on the side of the reverse surface 1R of the optical recording medium 1, respective condensing lenses $P_1$, $P_2$ positioned as pump light pickups rely between the pump sources $LD_1$, $LD_2$ and the optical recording medium 1, and respective collimator lenses $L_1$, $L_2$ positioned on the side of the principal surface 1S of the optical recording medium 1. When pumping light emitted by the pump sources $LD_1$, $LD_2$ is applied through the condensing lenses $P_1$, $P_2$ to the recording and reference regions 4, 5 of the optical recording medium 1, thermal lenses (not shown in FIG. 2) are formed respectively in the recording and reference regions 4, 5, providing resonators in the optical recording medium 1 for producing signal light $B_3$ and reference light $B_4$ as laser emission from the respective recording and reference regions 4, 5. The signal light $B_3$ and the reference light $B_4$ are then applied through the respective collimator lenses $L_1$, $L_2$ to a common beam splitter BS. The reference light $B_4$ from the collimator lens $L_2$ is reflected toward the beam splitter BS by a mirror M so that the signal light $B_3$ and the reference light $B_4$ are directed by the beam splitter BS to travel along a common optical axis toward a condensing lens $L_3$, which in turn converges the signal light $B_3$ and the reference light $B_4$ onto a detector 20 which may comprise a spectral analyzer. Since the reference region 5 is disposed in the optical recording medium 1, it is not necessary to provide a separate laser oscillator for producing reference light, and hence the playback system is relatively simple in structure.

Figure 3:
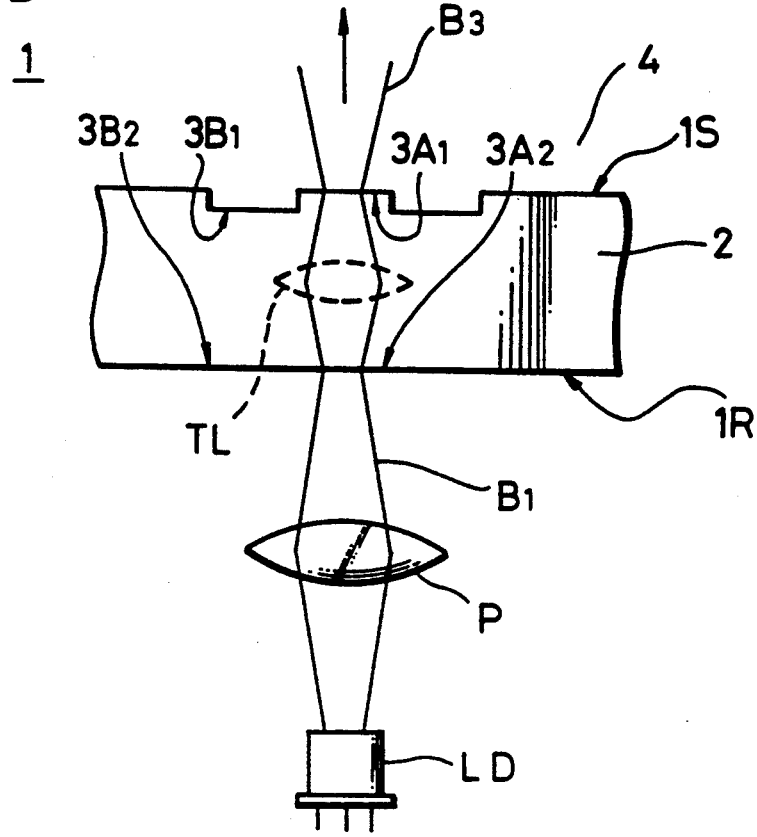
FIG. 3 is an enlarged fragmentary cross-sectional view illustrative of the principles of operation of the optical recording medium as an optically pumped laser.

The principles of operation of the optical recording medium 1 as an optically pumped laser will be described below with reference to FIG. 3. In FIG. 3, pumping light $B_1$ emitted by a pump source LD such as a laser diode is applied through a condensing lens P to the optical recording medium 1 through its reverse surface 1R. Since the pumping light $B_1$ applied to the optical recording medium 1 is converged by the condensing lens P, the pumping light B1 has a high optical power concentration in the optical recording medium 1. The high optical power concentration produces a temperature change of a sharp temperature distribution profile which results in a local refractive index variation that provides a corresponding thermal lens TL in the laser medium 2. The thermal lens TL in turn provides a local optical resonator having a pair of reflecting mirrors composed respectively of the parallel surfaces $3A_1$, $3A_2$ or $3B_1$, $3B_2$.

The local optical resonator emits signal light $B_3$ as laser emission, and the signal light $B_3$ has a wavelength or frequency that depends on the length of the resonator. Since local optical resonators formed in the optical recording medium 1 between the surfaces $3A_1$, $3A_2$ and $3B_1$, $3B_2$ have different lengths, they produce signal light $B_3$ of different wavelengths or frequencies. Therefore, the information recorded on the optical recording medium 1 as the pits and lands, i.e., the different distances or thicknesses d, $d+\Delta d$ between the surfaces $3A_1$, $3A_2$ and $3B_1$, $3B_2$ can be reproduced by detecting changes in the frequency of the signal light $B_3$.

The changes in the frequency of the signal light $B_3$ should preferably be detected according to a heterodyne beat detection process. More specifically, the reference light $B_4$ shown in FIG. 2 has a constant frequency close to the variable frequency of the signal light $B_3$ because the reference region 5 has the fixed thickness d. The changes in the frequency of the signal light $B_3$ can be detected based on the difference between the frequency of the signal light $B_3$ and the frequency of the reference light $B_4$.

In FIG. 2, the pump source $LD_1$, the condensing lens $P_1$, and the collimator lens $L_1$ of the signal light optical system 41, and the beam splitter BS are arranged coaxially with each other thicknesswise or transversely of the optical recording medium 1, i.e., along the length of a resonator in the optical recording medium 1. The pump source $LD_1$, the condensing lens $P_1$, the collimator lens $L_1$, and the beam splitter BS are fixedly mounted on an actuator (not shown) which is movable radially across the optical recording medium 1 along the principal surface 1S. The actuator moves the signal light optical system 41 and the beam splitter BS to follow recording tracks on the optical recording medium 1. The pump source $LD_2$, the condensing lens $P_2$, and the collimator lens $L_2$ of the signal light optical system 41, and the mirror M are also arranged coaxially with each other thicknesswise or transversely of the optical recording medium 1.

The spindle inserted in the central hole 6 of the optical recording medium 1 for fixing and rotating the optical recording medium 1 is supported by a support 8 which is coupled to a motor 9. Therefore, when the motor 9 is energized, the optical recording medium 1 is rotated about the spindle for reproducing the recorded information.

In the case where the laser medium 2 of the optical recording medium 1 is made of Nd:YAG, each of the pump sources $LD_1$, $LD_2$ may comprise an AlGaAs semiconductor laser capable of emitting a laser radiation having a wavelength of about 0.8 μm. If the optical recording medium 1 has a thickness of 1.2 mm, the thickness d is about 1.2 mm, and the thickness Δd is 0.01 μm, then the frequency of the signal light $B_3$ varies by Δν=about 2 GHz when the recorded information is read from the optical recording medium 1.

While the optical recording medium 1 is being rotated by the motor 9, the signal light $B_3$ emitted as laser emission from the recording region 4 of the optical recording medium 1 has its electric field varying with time as indicated by $E=E_0 e^{iwt}$ (where $E_O$ is the amplitude and w is the angular frequency ω), at a frequency of about several hundred GHz. The signal light $B_3$ and the reference light $B_4$ emitted respectively from the recording region 4 and the reference region 5 are applied to the detector 20, as described above. According to the heterodyne beat detection process, the detector 20 produces an AC output signal having a beat frequency of $|\omega_3-\omega_4|$ where $\omega_3$ is the angular frequency of the signal light $B_3$ and $\omega_4$ is the angular frequency of the reference light $B_4$, insofar as the intensities or amplitudes of the signal light $B_3$ and the reference light $B_4$ do not vary with time. As the beat frequency which is of about 2 GHz is detected from the pits in the recording region 4 as indicating a change in the thickness of the optical recording medium 1, the binary information recorded on the optical recording medium 1 can be read by detecting the beat frequency.

Since the recorded information is reproduced based on the beat frequency but not on the interference of light from the optical recording medium 1, the reproduced output signal contains relatively low noise and has relatively high S/N and C/N ratios.

The optical recording medium 1 can record multivalued information by providing three or more different thicknesses in the recording region 4. For example, the optical recording medium 1 may have steps of different depths in the recording region 4 to provide corresponding different thicknesses d+Δd, d+2Δd, d+3Δd, ... which represent recorded multivalued information.

Each of the principal surface 1S and the reverse surface 1R of the optical recording medium 1 may be coated with a dielectric layer having a certain reflectance. For example, each of the principal surface 1S and the reverse surface 1R of the optical recording medium 1 may have an antireflection (AR) coating with respect to the pumping light $B_1$, $B_2$ in order to allow the pumping light $B_1$, $B_2$ to be absorbed efficiently in the laser medium 2 and also to greatly reduce light returning to the pump sources $LD_1$, $LD_2$.

With respect to the laser emission, i.e., the signal light $B_3$ and the reference light $B_4$, the reverse surface 1R may have a highly-reflective (HR) coating having a reflectance of 99.9% or more, and the principal surface 1S may have an output coupler (OC) coating having a reflectance ranging from 90 to 98%. With such coatings, the laser medium 2 reliably provides resonators for generating laser emission from the principal surface 1S.

The thickness d of the optical recording medium 1 is selected to be in the range of $(c/2nB) \leq d \leq (c/nB)$ where n is the refractive index of the laser medium 2, B is the gain bandwidth of the laser medium 2, and c is the speed of light. The thickness d in the above range permits the optical recording medium 1 to generate signal light $B_3$ in a single longitudinal mode. As a result, the reproduced output signal indicative of the recorded information is of an increased S/N ratio and an increased C/N ratio, and information can be recorded in the optical recording medium in a high packing density.

More specifically, laser emissions from laser mediums have respective wavelengths depending on the materials of the laser mediums. The laser emission from a certain laser medium has a certain range of wavelengths or frequencies. A laser oscillator emits laser light only in a mode having a sufficient gain or amplification factor among resonant frequencies of the resonator. For example, the gain bandwidth for a laser emission having a wavelength of $\lambda=1.064$ μm from an Nd:YAG laser is about 140 GHz. Since the refractive index n of the laser medium of the Nd:YAG laser is about 1.8, the thickness d should be in the range of from about 0.6 mm to 1.2 mm.

In order for a laser to oscillate in a single longitudinal mode, it is optimum for only one resonant wavelength to be present within the gain bandwidth. The resonant wavelength is a wavelength λ which is an integral multiple of the length of the reciprocating path of the laser resonator, i.e., the value of 2nd where n is the refractive index of the optical recording medium and d is the thickness thereof. Thus, $$\lambda = (2nd)/N.$$

The wavelength λ is a wavelength in vacuum. Since the resonant frequency $\|$ is expressed by $\| = c/\|$, it can be given as follows:

$$\nu = Nc/(2nd).$$

On the frequency axis, resonance points are positioned at an interval of c/2nd which is referred to s an FSR (Free Spectral Range).

For the optical recording medium to oscillate in a single longitudinal mode, the resonance points spaced at the FSR should preferably be present in at least one mode and at most two modes within the above band bandwidth. Actually, even if wavelengths are present in two modes within the gain bandwidth, the two modes can hardly be established simultaneously due to SHB (Spatially Hole Burning). Accordingly, the condition for oscillation in a single longitudinal mode is given as follows:

$FSR \leq B \leq 2FSR$.

Since $FSR = c/2nd$, the above condition is rewritten as follows:

$(C/2nd) \leq B \leq (c/nd)$.

Therefore, the thickness d of the optical recording medium 1 is in the range of:

$(c/2nB) \leq d \leq (c/nB)$.

By thus selecting the thickness d of the optical recording medium 1, it can oscillate well in a single longitudinal mode.

Figure 5:
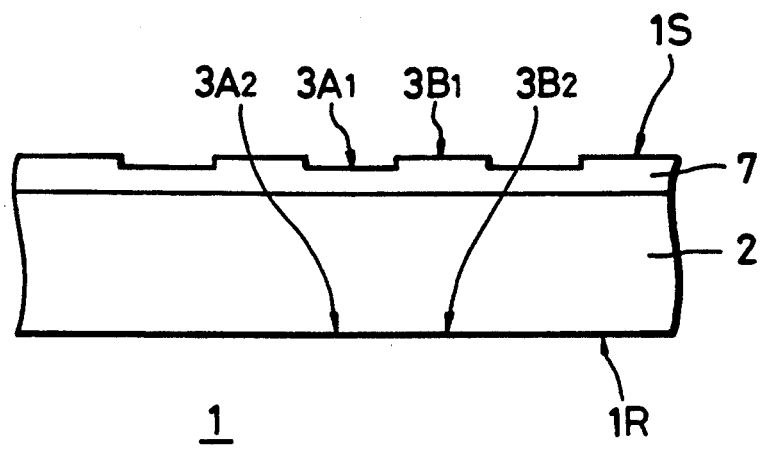
FIG. 5 is an enlarged fragmentary cross-sectional view of another optical recording medium according to the present invention.

FIG. 5 shows another optical recording medium according to the present invention. As shown in FIG. 5, the optical recording medium, generally designated by the reference numeral 1, which is in the form of an optical disc, is composed of a laser medium 2 such as of Nd:YAG or the like and a layer 7 of a light-transmissive material such as glass or the like. To fabricate the optical recording medium 1, the upper surface of the laser medium 2 is ground for a mirror finish, and then the layer 7 is bonded to the upper surface of the laser medium 2. The upper surface of the layer 7, i.e., the principal surface 1S of the optical recording medium 1 has pits and lands formed thereon by photolithography, for example, as representing recorded information. The pits and lands have respective bottom and top surfaces lying parallel to a reverse surface 1R of the optical recording medium 1 Specifically, each of the pits has a bottom surface $3A_1$, and the reverse surface 1R has a corresponding surface $3A_2$, and each of the lands has a top surface $3B_1$, and the reverse surface 1R has a corresponding surface $3B_2$.

The thickness of the optical recording medium 1 shown in FIG. 5 is selected in the range described above, and the principal and reverse surfaces 1S, 1R may have respective coatings referred to above, so that the recorded information can be reproduced from the optical recording medium 1 with high S/N and C/N ratios by the playback system shown in FIG. 2.

Figure 6:
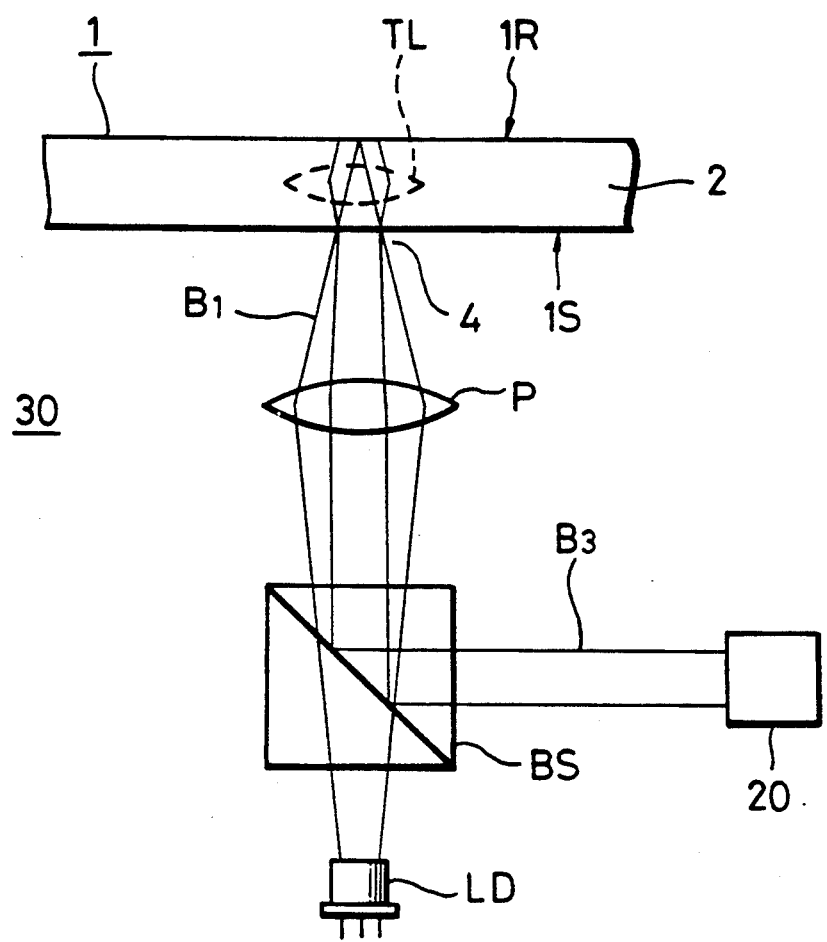
FIG. 6 is a schematic cross-sectional view of another playback system for optically playing back the optical recording medium.

FIG. 6 shows another playback system for optically playing back the optical recording medium 1.

The optical recording medium 1 has informationbearing pits and lands (not shown) on its principal surface 1S in the recording region 4. The playback system includes a pump source LD comprising a semiconductor laser such as a laser diode positioned on the side of the principal surface 1S of the optical recording medium 1. A laser beam emitted as pumping light by the pump source LD travels through a beam splitter BS such as a dichroic prism or the like, and is then converged by a condensing lens P as a pump light pickup onto the recording region 4 where the laser beam enters the recording medium 1 through the principal surface 1S. In the optical recording medium 1, a thermal lens L is formed by the applied laser beam, emitting laser signal light $B_3$ which is reflected by the reverse surface 1R and leaves the optical recording medium 1 from the principal surface 1S. The signal light $B_3$ is collimated by the condensing lens P, and reflected by the beam splitter BS toward a detector 20.

The optical recording medium 1 to be optically played back by the playback system shown in FIG. 6 may be essentially the same as the optical recording medium 1 shown in FIG. 1 or the optical recording medium 1 shown in FIG. 5. Specifically, each of the principal surface 1S and the reverse surface 1R of the optical recording medium 1 is has an AR coating with respect to the pumping light $B_1$. With respect to the signal light $B_3$, the principal surface 1S has an OC coating having a reflectance ranging from 90 to 98%, and the reverse surface 1R has an HR coating having a reflectance of 99.9% or more. Such coatings are effective to prevent the pumping light $B_1$ from returning to the pump source LD, and to allow the signal light $B_3$ to be emitted efficiently from the optical recording medium 1.

The optical recording medium 1 shown in FIG. 6 may have a reference region (not shown) radially inwardly of the recording region 4, i.e., leftwardly of the recording region 4 in FIG. 6. Reference light emitted from the reference region is applied, from left, to the beam splitter BS, and passes therethrough so that the reference light and the signal light $B_3$ are applied to the detector 20. Based on the difference between the frequencies of reference light and the signal light $B_3$, the beat frequency of the signal light $B_3$ may be detected to detect the information recorded on the optical recording medium 1 according to the heterodyne beat detection process as described above.

The laser medium 2 of each optical recording mediums 1 described above may be made of any of various other materials than Nd:YAG.

In the illustrated embodiments, the reference light is emitted from the reference region 5 of the optical recording medium 1. However, a laser beam emitted from an external laser source separate from the optical recording medium 1 and having a frequency close to the frequency of the signal light $B_3$ may be applied as reference light to the detector 20.

Having described preferred embodiments of the invention with reference to the accompanying drawings, it is to be understood that the invention is not limited to that precise embodiments and that various changes and modifications could be effected by one skilled in the art without departing from the spirit or scope of the invention as defined in the appended claims.

What is claimed is:

1. An optical recording medium comprising:
    a recording region at least partly composed of a laser medium extending thicknesswise thereof;
    said recording region having pits and lands formed on a principal surface thereof as representing recorded information, said pits and lands having respective first surfaces parallel to corresponding second surfaces on an opposite reverse surface of the recording region, said first and second surfaces providing different thicknesses of the recording region;
    whereby said recording region can operate as optical resonators between said first and second surfaces for emitting laser signal light of a variable frequency depending on said recorded information in response to pumping light applied to the recording region, said optical resonators having respective optical axes extending thicknesswise of said recording region.

2. An optical recording medium according to claim 1, wherein said recording region has a thickness d selected in the range of:

$$(c/2nB) \leq d \leq (c/nB)$$

where n is the refractive index of the laser medium, B is the gain bandwidth of the laser medium, and c is the speed of light.

3. An optical recording medium according to claim 1, further including a reference region for emitting reference light having a constant frequency to detect a change in the frequency of said signal light emitted from said recording region based on the difference between the frequencies of said signal light and said reference light.

4. An optical recording medium according to claim 3, wherein the optical recording medium comprises an optical disc, said reference region being positioned radially inwardly of said recording region.

5. An optical recording medium according to claim 1, further including an antireflection coating on each of said principal and reverse surfaces with respect to the pumping light, a highly-reflective coating on said reverse surface with respect to said signal light, and an output coupler coating on said principal surface with respect to said signal light.

6. An optical recording medium according to claim 1, further including a light-transmissive layer on said laser medium, said light-transmissive layer having said principal surface.

7. A method of optically playing back an optical recording medium having a recording region at least partly composed of a laser medium extending thicknesswise thereof, said recording region having pits and lands formed on a surface thereof as representing recorded information, said pits and lands having respective first surfaces parallel to corresponding second surfaces on an opposite surface of the recording region, said first and second surfaces providing different thicknesses of the recording region, whereby said recording region can operate as optical resonators between said first and second surfaces for emitting laser signal light of a variable frequency depending on said recorded information in response to pumping light applied to the recording region, said optical resonators having respective optical axes extending thicknesswise of said recording region, said method comprising the steps of:

applying pumping light to said recording region to cause the recording region to operate as optical resonators between said first and second surfaces for emitting laser signal light of a variable frequency depending on said recorded information; and detecting a change in the frequency of said signal light to reproduce said recorded information.

8. A method according to claim 7, wherein said optical recording medium has a reference region for emitting reference light having a constant frequency, further including the step of:

detecting a change in the frequency of said signal light based on the difference between the frequencies of said signal light and said reference light.

* * * * *